(12) United States Patent
Ganichot

(10) Patent No.: US 8,405,240 B2
(45) Date of Patent: Mar. 26, 2013

(54) AUGMENTED VELOCITY HYDRO-ELECTRIC TURBINE GENERATOR

(76) Inventor: Paul R Ganichot, Tampa, FL (US)

( * ) Notice: Subject to any disclaimer, the term of this patent is extended or adjusted under 35 U.S.C. 154(b) by 0 days.

(21) Appl. No.: 13/341,035

(22) Filed: Dec. 30, 2011

(65) Prior Publication Data

US 2012/0098264 A1    Apr. 26, 2012

(51) Int. Cl.
*F01D 15/10* (2006.01)
*F02C 6/00* (2006.01)
*H02P 9/04* (2006.01)
*H02K 7/18* (2006.01)

(52) U.S. Cl. .......................................... 290/52

(58) Field of Classification Search .............. 290/52–54, 290/42, 43
See application file for complete search history.

(56) References Cited

U.S. PATENT DOCUMENTS

| 3,934,410 | A * | 1/1976 | Williams | 60/269 |
| 7,621,129 | B2 * | 11/2009 | DuBois | 60/641.2 |
| 2011/0002777 | A1 * | 1/2011 | Smith | 415/176 |
| 2011/0148117 | A1 * | 6/2011 | Bailey | 290/52 |

* cited by examiner

*Primary Examiner* — Javaid Nasri

(57) ABSTRACT

This invention provides an augmented velocity hydraulic power generator comprised of an induced vortex in combination with other fluid velocity enhancement techniques to maximize power output enabling a minimal apparatus size and minimal or no environmental impact.

8 Claims, 14 Drawing Sheets

Sequential Linkage of multiple hydro power turbine generators

Parallel linkage of multiple hydro power turbine generators

AUGMENTED VELOCITY HYDRO-ELECTRIC TURBINE GENERATOR

BACKGROUND OF THE INVENTION

The standard approach to hydro electric power generator focuses either on a large rotor diameter or on a large altitude change in order to maximize the power output. The resulting environmental impacts are therefore typically enormous and the initial installation is both prohibitively expensive and requires a long time.

SUMMARY OF THE INVENTION

This invention provides an improved hydro electric turbine power generator characterized by an augmented water velocity allowing the apparatus to remain small in size.

In the invention, the hydro power turbine generator operates to generate electrical power from a naturally occurring water flow, and in particular sea tide and river flow, with said hydro power turbine positioned submerged in said water flow through an augmented water flow velocity by:
 a. Inducing a water flow vortex through a combination of spiraling helixes within said hydro power turbine;
 b. A shrouded turbine casing comprised of a shroud affixed to a turbine casing with said shroud compressing the water flow traversing said hydro power turbine to augment the water flow velocity within said hydro power turbine with therefore said shroud acting as a compression shroud;
 c. A central cone and tube positioned and attached inside said shrouded turbine casing to further augment the water flow velocity within said hydro power turbine by further compressing the flow of fluid traversing said hydro power turbine.

In this invention, said induced water flow vortex inside said hydro power turbine is generated by a spiraling helix affixed to the interior surface of said shrouded turbine casing and a spiraling helix affixed to the exterior surface of said central cone and tube to increase the distance the water flow must travel while traversing said hydro power turbine and consequently augment the water flow velocity within said hydro power turbine including maximizing the velocity of said water flow vortex at the perimeter of said water flow vortex alongside the interior surface of said hydro power turbine casing. Additionally, because the diameter of the shroud at the point of ingress of the water flow into the hydro turbine generator is larger than the diameter of the shroud at the junction point with the turbine casing, the shroud acts as a compression shroud, compressing the water flow traversing said shroud.

The hydro power turbine further includes an electric generator rotor with an annular shape and turbine blades affixed to the interior side of said electric generator rotor and that is set in motion by the augmented velocity of the induced water flow vortex within said hydro power turbine. Said electric generator rotor is affixed to said hydro power turbine casing at the diametrically opposite end of where the shroud of said shrouded turbine casing is positioned. Because the velocity of said water flow vortex is maximized at the perimeter of said water flow vortex alongside the interior surface of said hydro power turbine casing the turbine blades affixed to the interior side of said electric generator rotor are optimally set in motion by the augmented velocity of the water flow vortex within said hydro power turbine. The augmented velocity water flow vortex is confined while traversing said hydro turbine generator to the space between the exterior side of the central cone and the interior side of the rotor, consequently applying pressure on the turbine blades affixed to the interior side of said rotor and forcing said rotor into rotation.

The hydro power turbine includes an electric generator stator affixed to the turbine casing and overlap the electric generator rotor to generate electric power.

A preferred embodiment of this invention positions the central cone inside the turbine's casing and prolongs said cone by a tube parallel to said casing.

Embodiments of this invention may include shaping the central cone and tube in a half or full prolate spheroid.

It is thus a feature of at least one embodiment of the invention to generate the induced vortex with a spiraling helix located on the interior surface of the turbine's casing and shroud and on the exterior surface of the central cone and tube.

Embodiments of this invention may include adjustments to the hydro power turbine generator diameter and length of the shrouded turbine casing, central cone, and tube to optimize water flow velocity and electric power output.

The hydro power turbine further includes means to maintain it at specific depth and placement in the flow through a combination of ballast, buoyancy tanks, tethers, and fins.

An embodiment of this invention may include use of lightweight construction materials such as plastics.

Embodiments of this invention may include modular expansions such as:
 a. A second hydro power turbine affixed to the rotor diametrically opposite to the first hydro power turbine.
 b. Multiple hydro power turbine or sections thereof, linked sequentially.
 c. Multiple hydro power turbine or sections thereof, positioned parallely.

Preferred embodiments of the invention include features to minimize or eliminate the environmental impact such as:
 a. A small hydro power turbine size compared to the industry's average obtained through the focus of enhanced fluid velocity.
 b. Protection grilles to deflect wildlife.

While the invention has been described in detail with specific reference to preferred embodiments thereof, it is understood that variations and modifications thereof may be made without departing from the spirit and scope of the invention.

The present invention provides an improved hydro electric power generation turbine leveraging naturally occurring water flows and in particular tidal and river flows. The standard approach to hydro electric power generator focuses either on a large electric generator rotor diameter or on a large altitude change in the water flow in order to maximize the electric power output. The resulting environmental impacts are therefore typically enormous and the initial installation is both prohibitively expensive and requires a long time. This invention utilizes a combination of mechanisms to enhance water flow velocity in accordance to the fluid dynamics equation of continuity and therefore generates electric power with a much smaller electric generator rotor than in standard approaches and with no altitude change in the water flow.

Figure 1:
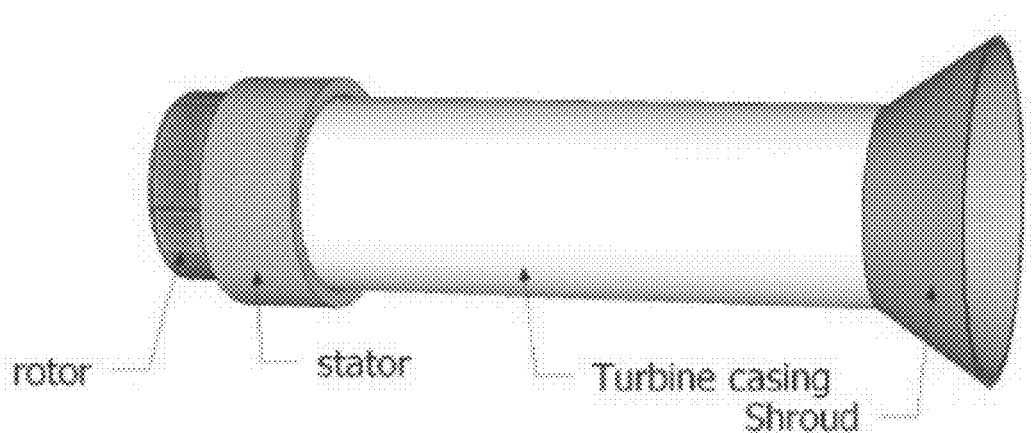
FIG. 1: Side view of an embodiment of the invention showing a shrouded turbine casing with a shroud, turbine casing, electric generator stator and electric generator rotor.
Figure 2:
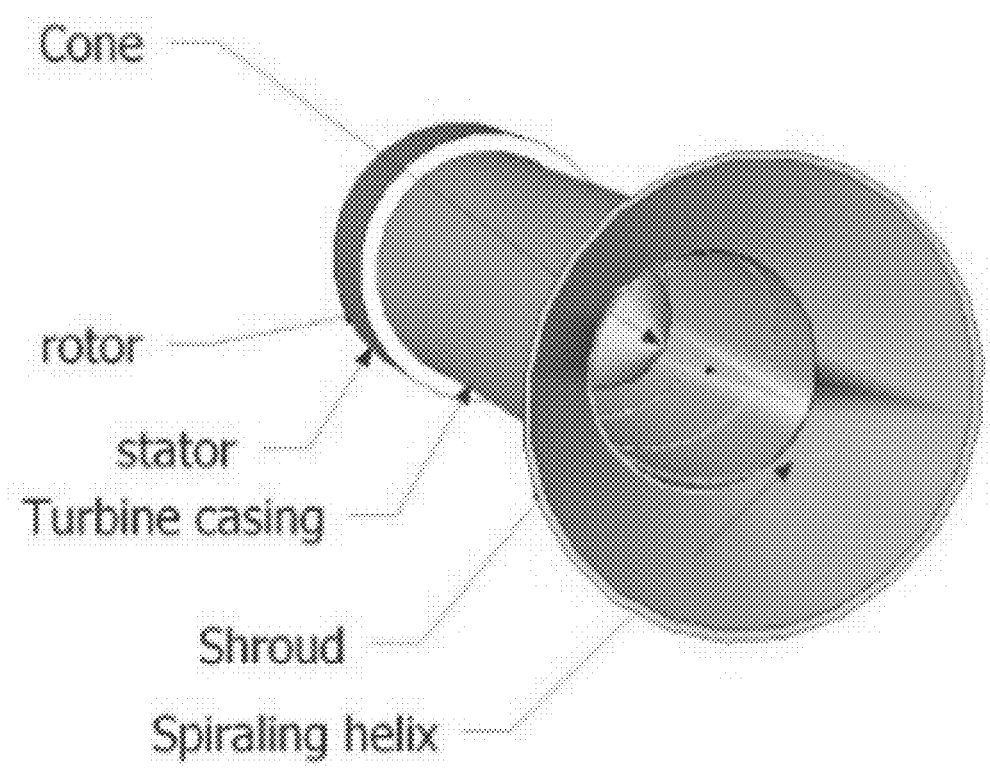
FIG. 2: Oblique view of an embodiment of the invention showing a shroud, turbine casing, electric generator stator and electric generator rotor along with a central cone and a spiraling helix located on the interior side of the turbine casing.

FIG. 1 and FIG. 2 of the drawings, present the side view of an embodiment of the invention, showing the shroud, turbine casing, electric generator stator and electric generator rotor along with the oblique view of an embodiment of the invention showing a shroud, turbine casing, electric generator stator and electric generator rotor along with a central cone and a spiraling helix located on the interior surface of the turbine casing. The shroud of the shrouded turbine casing of the hydro electric power turbine represents the end of the hydro electric power turbine through which the water flow enters the hydro electric power turbine. The shroud is a compression shroud, compressing the water flow traversing the hydro power turbine. The electric generator rotor of the hydro electric power turbine represents the end of the hydro electric power turbine through which the water flow exists the hydro electric power turbine. The electric generator rotor has an annular shape, is affixed with turbine blades on the interior side of the annular electric generator rotor, and is set in motion by the augmented water flow velocity of the induced water flow vortex inside the hydro power turbine.

The hydro electric power turbine generator is used submerged in a naturally occurring water flow and in particular in a tidal or river flow. A river is a natural flowing body of water, usually freshwater, flowing towards an ocean, a lake, a sea, or another river. Tides are the rise and fall of sea levels caused by the combined effects of the gravitational forces exerted by the Moon and the Sun and the rotation of the Earth. The tidal rise and fall of sea levels creates natural flows of water alternatively towards and away from the shore.

Figure 5:
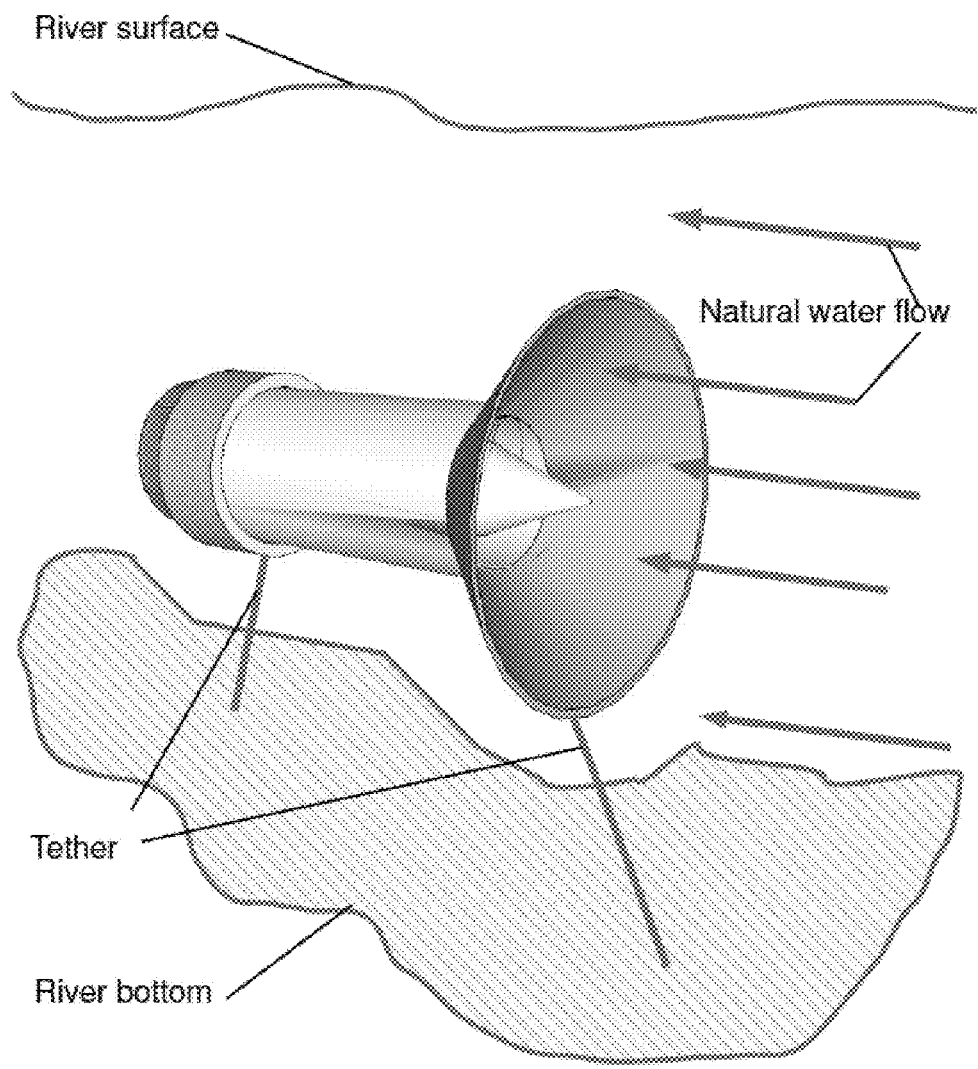
FIG. 5: Oblique view of an embodiment of the invention tethered to the bottom of a river in the middle of a flowing body of water, allowing the flow of water to traverse the turbine from the shroud to the rotor.

FIG. 5 shows an embodiment of the invention tethered to the bottom of a river in the middle of a flowing body of water resulting from a sea tide or river water flow, allowing the flow of water to traverse the hydro electric power turbine from the shroud to the rotor.

Figure 3:
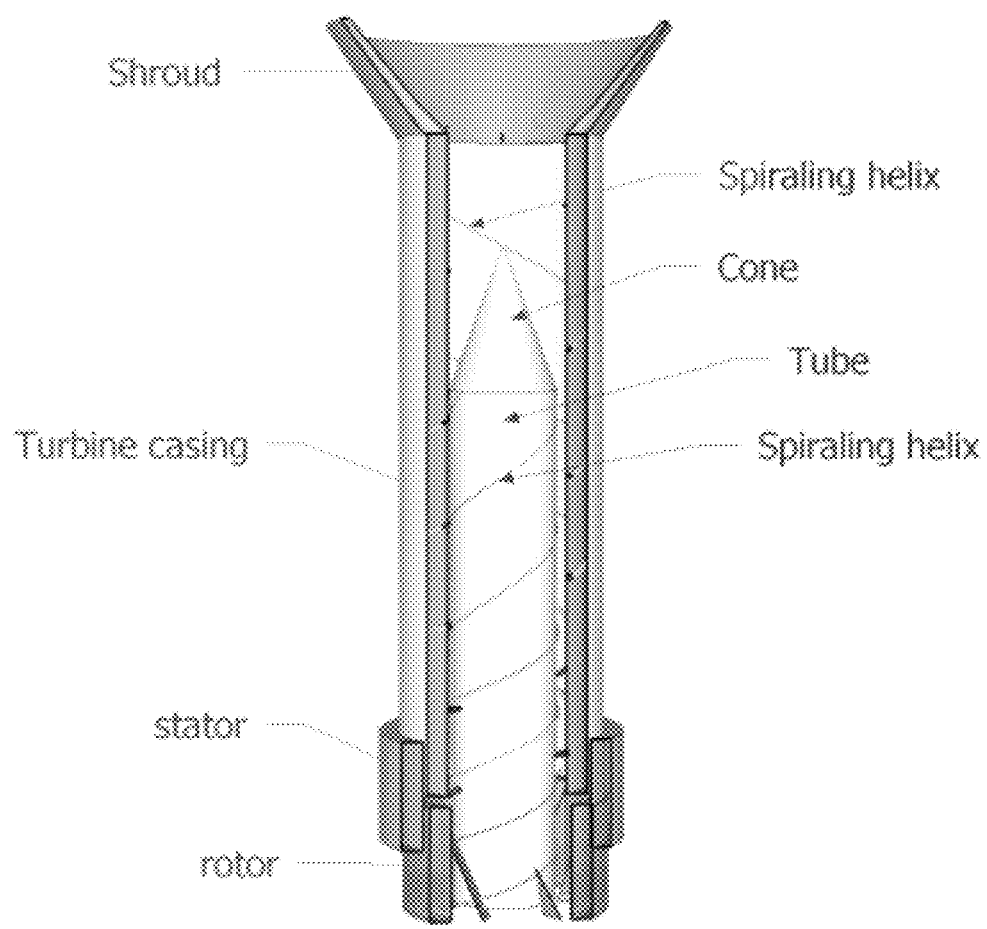
FIG. 3: Vertical view of a section of an embodiment of the invention showing a shroud, turbine casing, electric generator stator and electric generator rotor along with a central cone, central tube, a spiraling helix located on the exterior surface of said central cone and tube, and a spiraling helix located on the interior surface of the turbine casing.

As presented in FIG. 3 the diameter of the hydro electric power turbine casing is smaller than the largest diameter of the shroud therefore increasing the velocity of the water flow entering the hydro electric power turbine from the side of the hydro electric power turbine where the shroud is positioned to compensate for the decrease in area the water is traversing in accordance to the fluid dynamics equation of continuity. Accordingly this shroud is a compression shroud, compressing the water flow traversing the hydro power turbine. The central cone and central tube positioned inside the hydro electric power turbine casing further decrease the area the water is traversing and therefore further increase the velocity of the water traversing the area between the turbine casing and the central tube by further compressing the water flow traversing the hydro power turbine. The spiraling helix positioned on the interior surface of the turbine casing induce the water flow traversing the hydro electric power turbine into a vortex further increasing the velocity of the water flow traversing the area between the turbine casing and the central tube. The spiraling helix positioned on the exterior surface of the central cone and central tube further induce the water flow traversing the hydro electric power turbine into a vortex further increasing the velocity of the water flow traversing the area between the turbine casing and the central tube. FIG. 3 represents an embodiment of the hydro electric power turbine generator equipped with two spiraling helixes: one spiraling helix positioned on the interior surface of the turbine casing and one spiraling helix positioned on the exterior surface of the central cone and central tube.

The water flow induced vortex traversing the area between the hydro electric power turbine casing and the central tube reaches the electric generator rotor affixed to the hydro electric power turbine at the diametrically opposite end of where the compression shroud is positioned forcing the electric generator rotor into a rotational speed proportional to the enhanced water flow velocity described above. The electric generator rotor has an annular shape and turbine blades affixed to the interior side of the electric generator rotor and is set in motion by the augmented velocity of the induced water flow vortex within the hydro power turbine. Said electric generator rotor is affixed to said hydro power turbine casing at the diametrically opposite end of where the shroud of said shrouded turbine casing is positioned. Because the velocity of said water flow vortex is maximized at the perimeter of said water flow vortex alongside the interior surface of said hydro power turbine casing the turbine blades affixed to the interior side of said electric generator rotor are optimally set in motion by the augmented velocity of the water vortex within said hydro power turbine. The electric generator rotor motion creates a rotating magnetic field that induces a current in the electric generator stator. Consequently, the novelty of this invention stems from the unique combination of features leveraged to augment the velocity of the water flow within this hydro power turbine along with the specified shape of the rotor set in motion by said water flow within the hydro power turbine;
 a. A shroud compressing the water flow traversing the hydro power turbine;
 b. A central cone and tube inside the turbine casing further compressing the water flow traversing the hydro power turbine;
 c. A spiraling helix affixed to the interior surface of the shrouded turbine casing and a spiraling helix affixed to the exterior surface of the central cone and tube inducing a water flow vortex within the hydro power turbine;
 d. An electric generator rotor with an annular shape and turbine blades affixed to the interior side of the electric generator rotor and that is set in motion by the augmented water flow velocity of the induced water flow vortex inside the hydro power turbine;
 e. An electric generator stator affixed to the hydro power turbine casing and overlapping the electric generator rotor to generate electric power.

Figure 4:
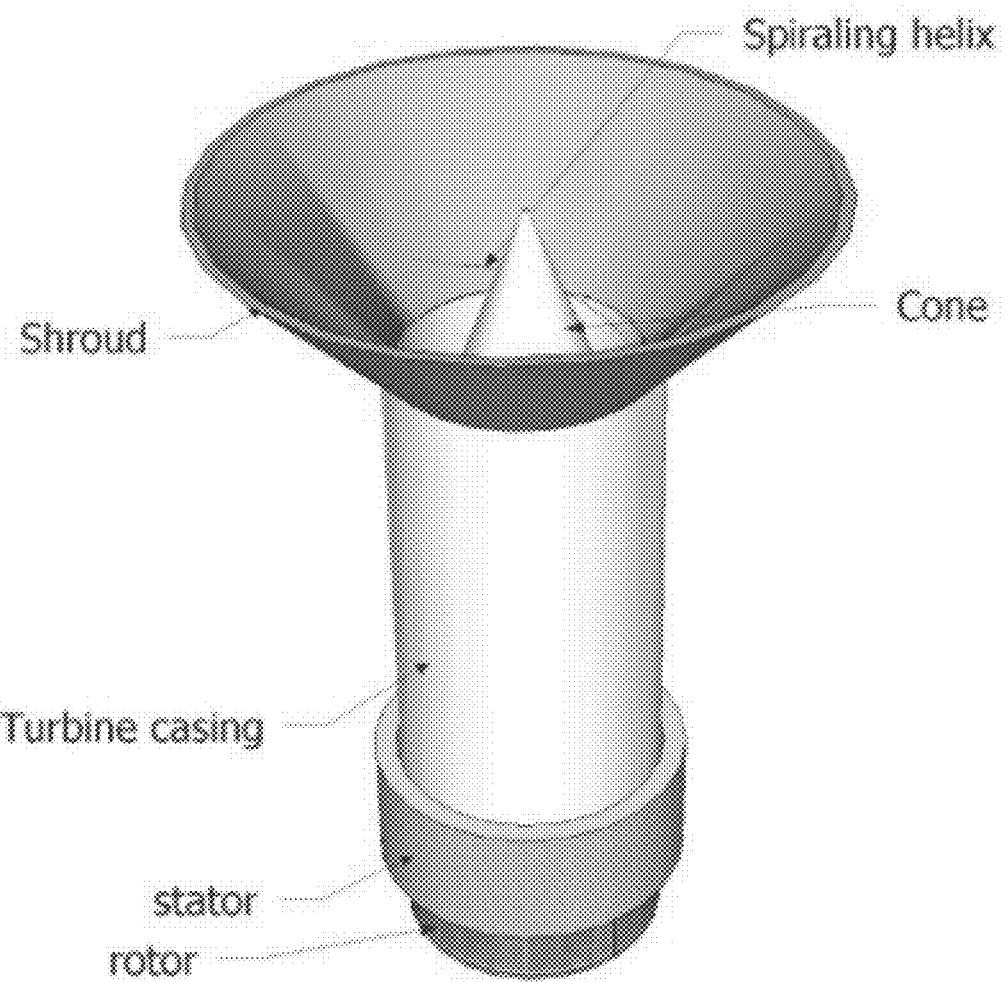
FIG. 4: Oblique view of an embodiment of the invention with adjusted diameter and length of the shrouded turbine casing, central cone and tube showing a shroud, turbine casing, electric generator stator and electric generator rotor, along with a central cone and a spiraling helix located on the interior side of the turbine casing.

FIG. 4 represents an embodiment of the hydro electric power turbine generator with the central cone and tube positioned within the turbine casing in such a way that the cone element of the central cone and tube intersects the diameter of the shroud of the shrouded turbine casing.

Figure 6:
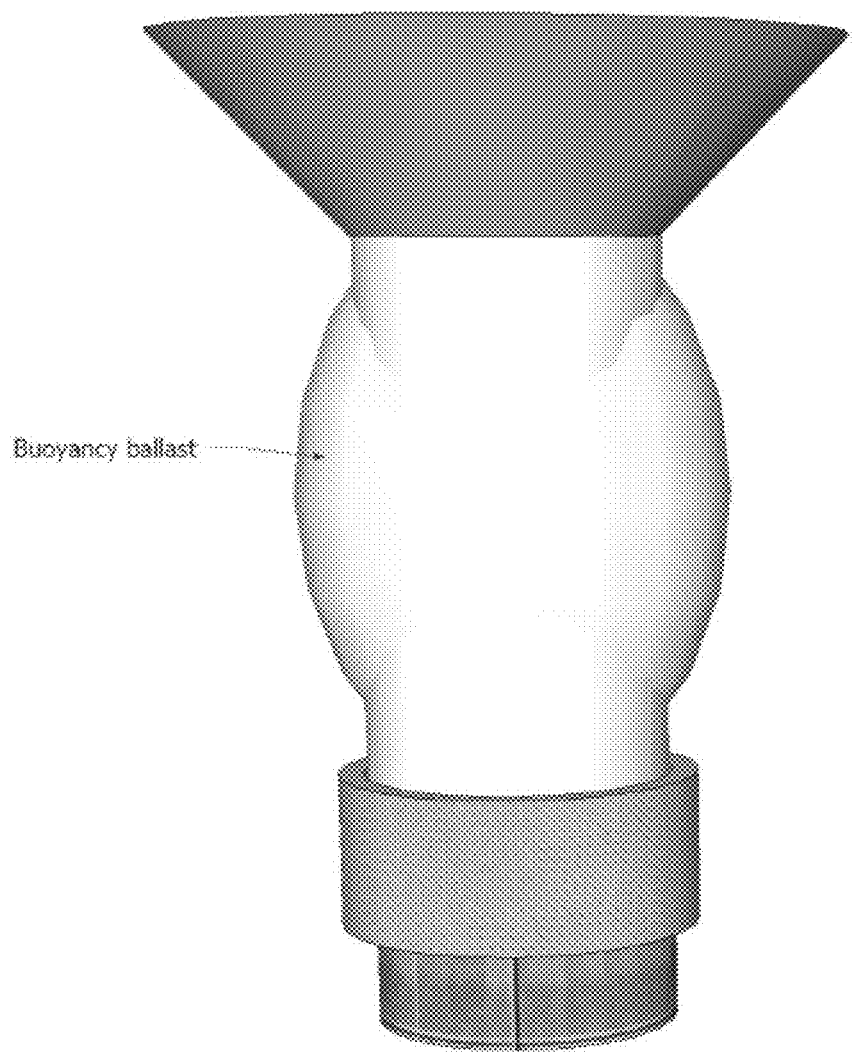
FIG. 6: Vertical view of an embodiment of the invention equipped with two buoyancy ballasts and showing a shroud, turbine casing, electric generator stator and electric generator rotor.

FIG. 6 represents an embodiment of the hydro electric power turbine generator equipped with two buoyancy ballasts. These two buoyancy ballasts are filled with a combination of air and water to enable said hydro electric power turbine to float at the desired depth when submerged in a river or in a sea.

Figure 7:
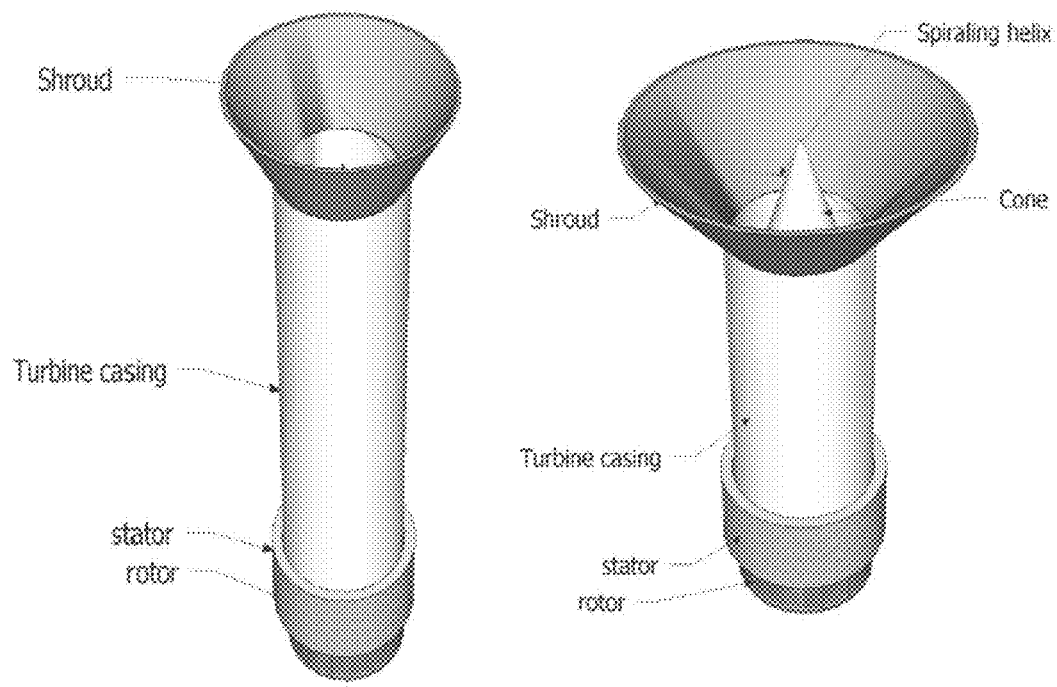
FIG. 7: Oblique view of two different embodiments of the invention with different proportions for their respective shroud and turbine casing and with different positioning of the central_cone and tube.

FIG. 7 represents two different embodiments of the invention with different proportions for their respective shroud, turbine casing, and central cone and tube and with different positioning of the central cone and tube in order to optimize the velocity of the water flow traversing the hydro electric power turbine.

Figure 8:
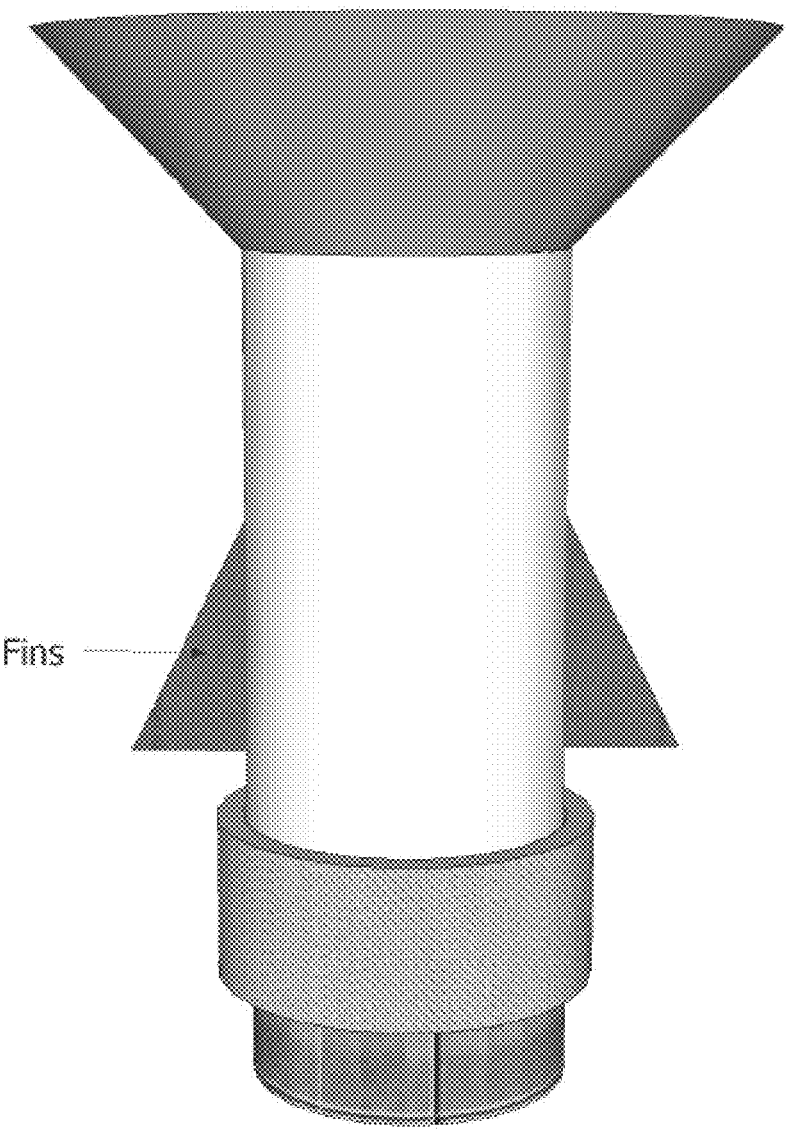
FIG. 8: Vertical view of an embodiment of the invention equipped with two fins and showing a shroud, turbine casing, electric generator stator and electric generator rotor.

FIG. 8 represents an embodiment of the hydro electric power turbine generator equipped with two fins to optimize the of the placement of the hydro power turbine in the water flow.

Figure 9:
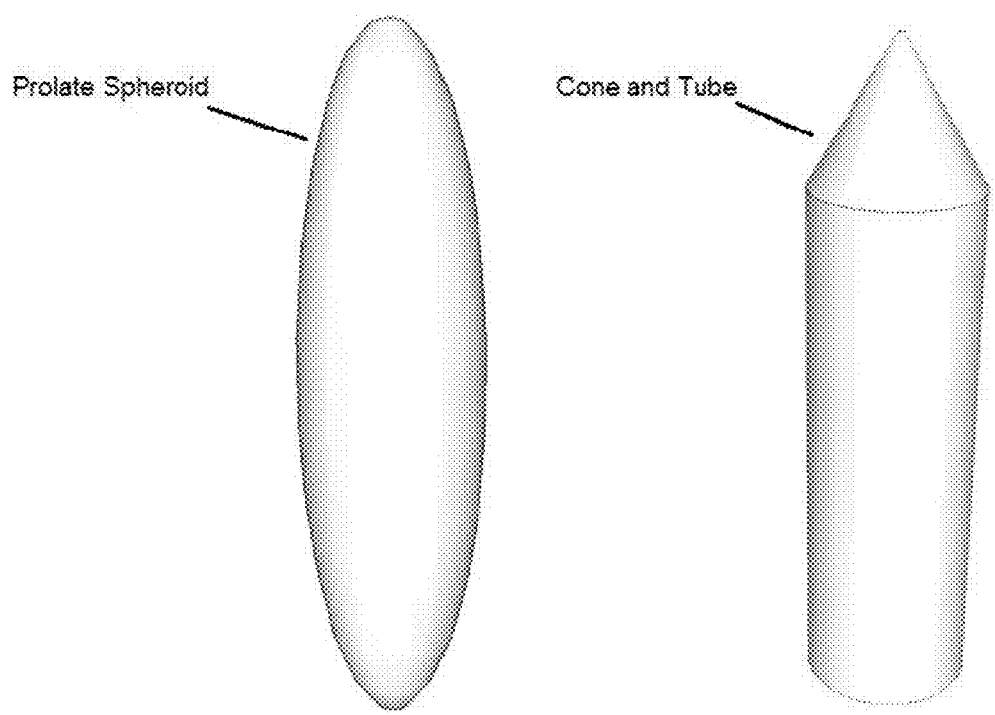
FIG. 9: Vertical view of an two different embodiments of the central cone and tube of the hydro electric power turbine generator with one of these embodiments shaped as a prolate spheroid.

FIG. 9 represents two different embodiments of the central cone and tube of the hydro electric power turbine generator with one of these embodiments shaped as a prolate spheroid to minimize the turbulence of the water flow within the hydro electric power turbine.

Figure 10:
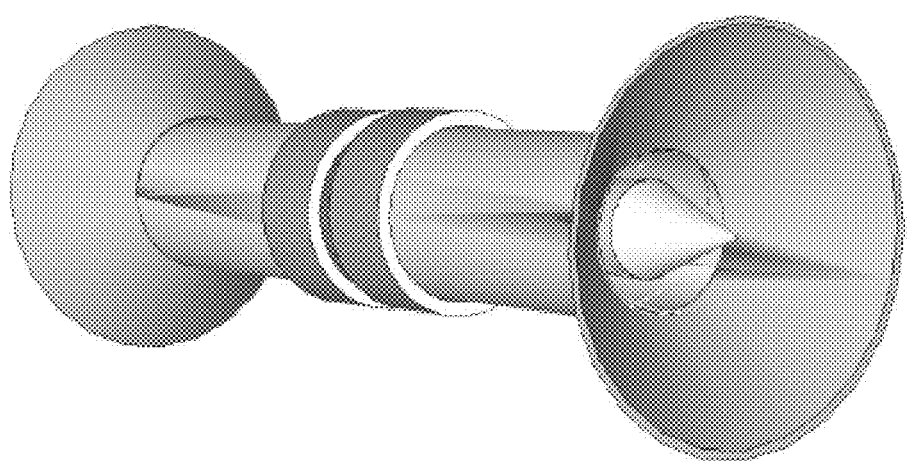
FIG. 10: Oblique view of an embodiment of the of the invention equipped with two hydro electric power turbine generators affixed diametrically opposite at the electric generator rotor element of the hydro electric power turbine.

FIG. 10 represents an embodiment of the of the invention equipped with two hydro electric power turbine generators affixed diametrically opposite at the electric generator rotor element of the hydro electric power turbine in order to allow a tidal water flow to traverse the invention from either shroud ends of the embodiment described in this paragraph.

Figure 11:
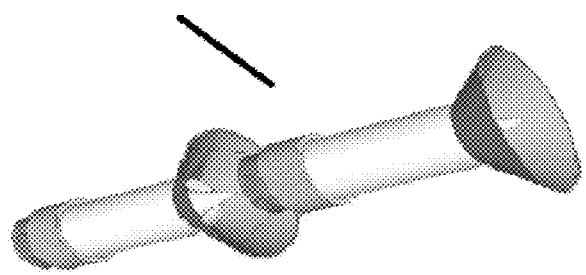
FIG. 11: Oblique view of a sequential and a parallel linkages of multiple embodiments of the invention.
Figure 11:
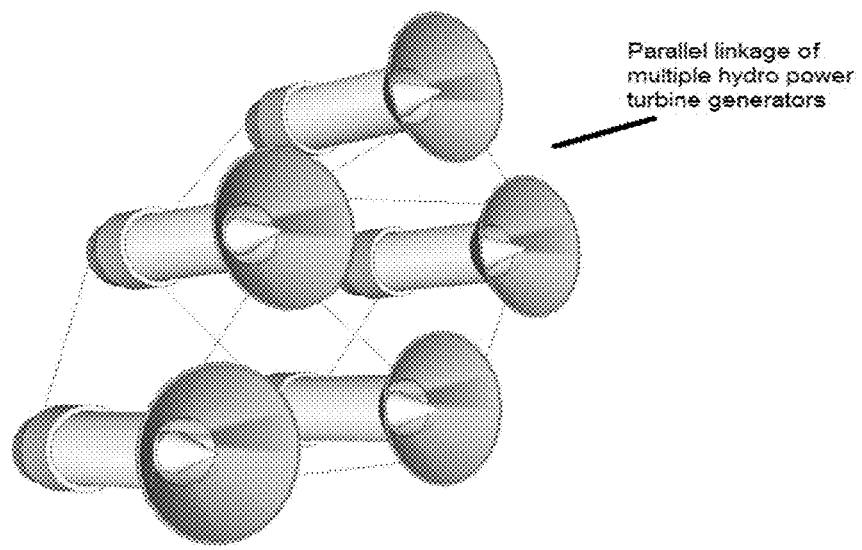

FIG. 11 represents a sequential and a parallel linkages of embodiments of the invention demonstrating examples of potential linkages of multiple hydro turbine power generators. It is expected that a sequential linking of multiple hydro power turbine generators would maximize electric power generation when submerged in a narrow body of water and especially a river or a narrow sea strait. It is also expected that a parallel linking of multiple hydro power turbine generators would maximize electric power generation when submerged in a wide body of water and especially a wide river or a sea.

Figure 12:
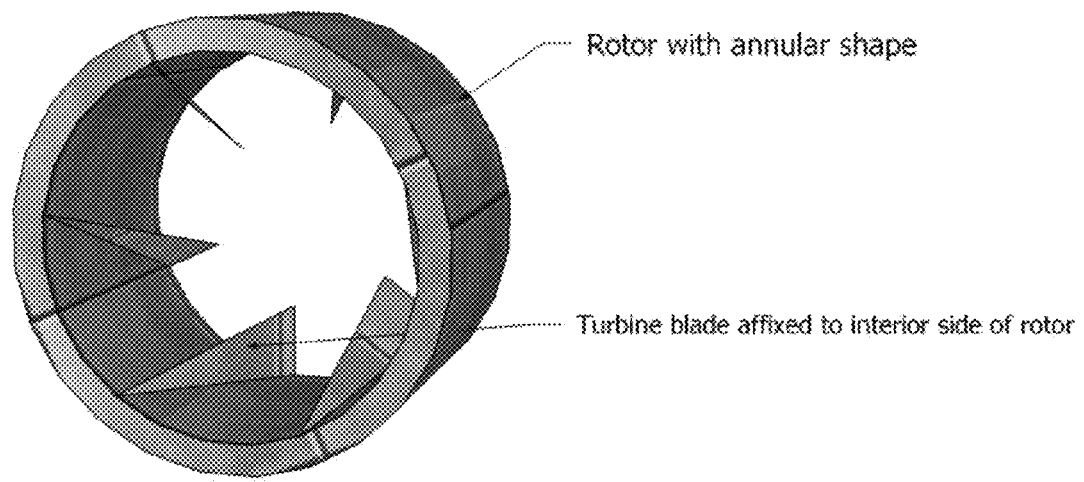
FIG. 12: Oblique view of the electric generator rotor with an annular shape and turbine blades affixed to the interior side of said electric generator rotor.

FIG. 12 represents the electric generator rotor that is the rotating part of the electric generator with said electric generator rotor characterized in this invention by an annular shape and turbine blades affixed to the interior side of said electric generator rotor.

Figure 13:
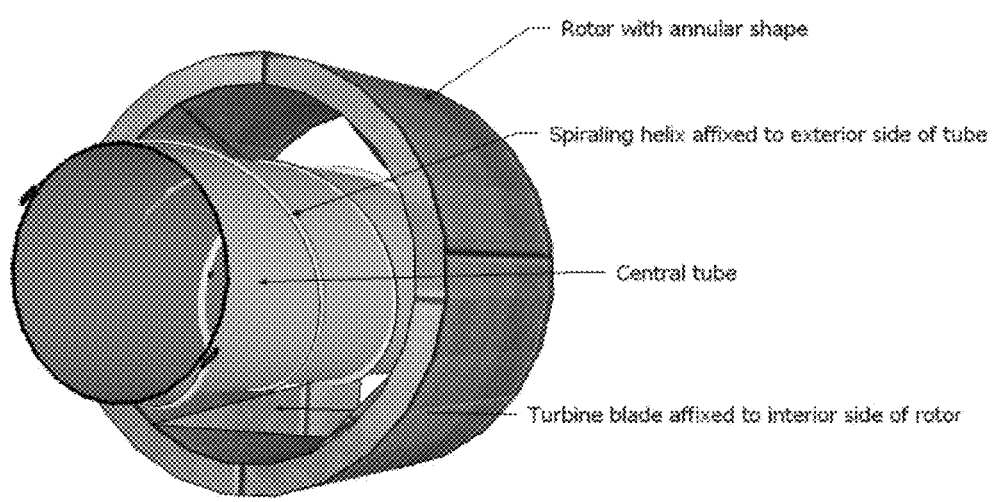
FIG. 13: Oblique view of the electric generator rotor with an annular shape and turbine blades affixed to the interior side of said electric generator rotor and a section of the central tube with a spiraling helix affixed to the exterior side of said central tube.

FIG. 13 represents the electric generator rotor with an annular shape, turbine blades affixed to the interior side of said rotor and a section of the central tube with a spiraling helix affixed to the exterior side of said central tube. According to this representation and the previous detailed descriptions, the augmented velocity and induced vortex water flow is confined while traversing said hydro turbine generator to the space between the exterior side of the central cone and the interior side of the rotor, consequently applying pressure on the turbine blades affixed to the interior side of said rotor and forcing said rotor into rotation.

Figure 14:
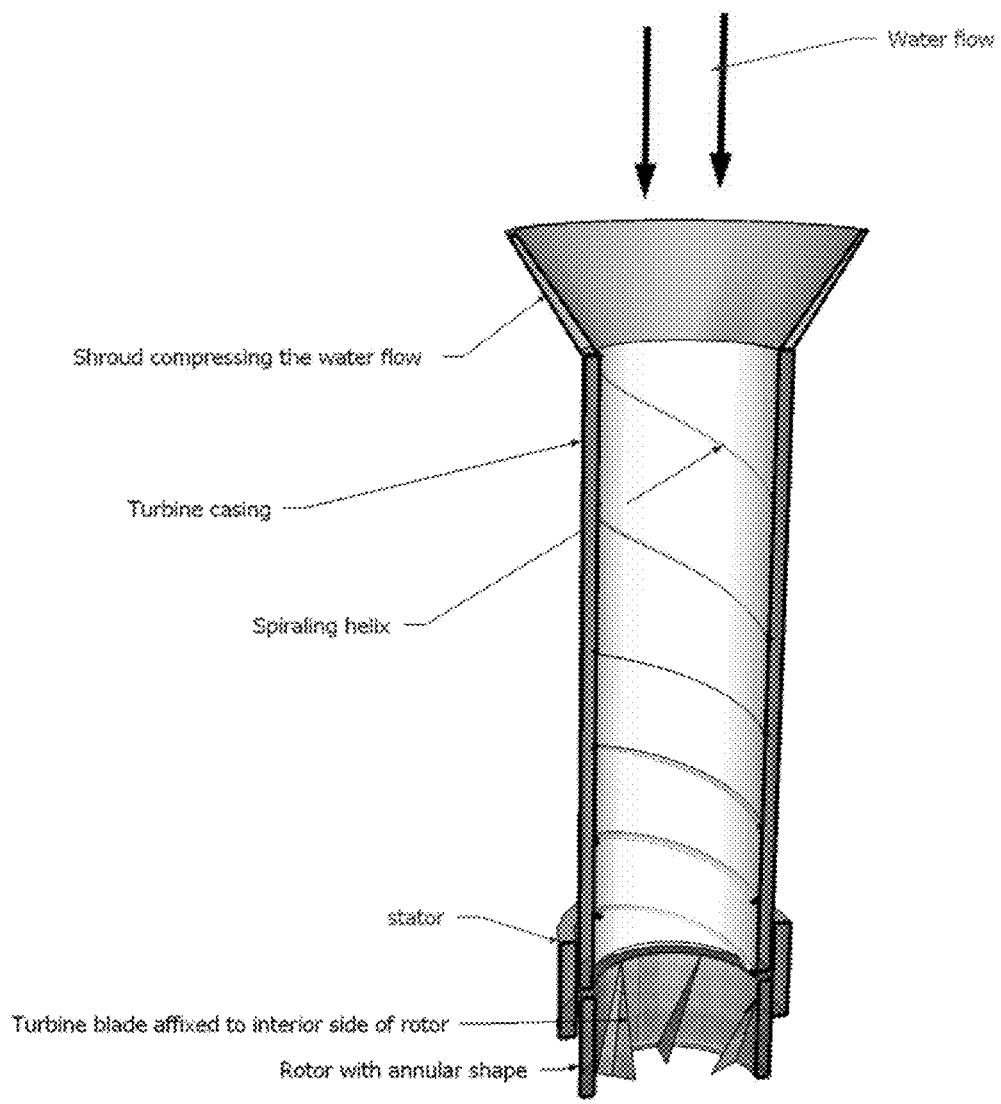
FIG. 14: Vertical view of a section of an embodiment of the invention showing the shroud compressing the water flow entering the hydro power generator along with the turbine casing, a spiraling helix affixed to the interior side of said turbine casing, the electric generator rotor with an annular shape, the turbine blades affixed to the interior side of the electric generator rotor, and the overlapping electric generator stator.

FIG. 14 represents the shroud compressing the water flow entering the hydro power generator along with the turbine casing, a spiraling helix affixed to the interior side of said turbine casing, the electric generator rotor with an annular shape, the turbine blades affixed to the interior side of the electric generator rotor, and the overlapping electric generator stator. Because the diameter of the shroud at the point of ingress of the water flow into the hydro turbine generator is larger than the diameter of the shroud at the junction point with the turbine casing, the shroud acts as a compression shroud, compressing the water flow traversing said shroud.

What is claimed is:

1. A hydro power turbine generator for generating electrical power from a naturally occurring water flow, said hydro power turbine positioned submerged in said water flow and characterized by an augmented water flow velocity through:
 a. a shrouded turbine casing comprised of a shroud affixed to a turbine casing to augment the water flow velocity within said hydro power turbine by compressing the water flow traversing said hydro power turbine with therefore said shroud acting as a compression shroud;
 b. a central cone and tube positioned and attached inside said shrouded turbine casing to further augment the water flow velocity within said hydro power turbine by further compressing the water flow traversing said hydro power turbine;
 c. an induced water flow vortex inside said hydro power turbine generated by a spiraling helix affixed to the interior surface of said shrouded turbine casing and a spiraling helix affixed to the exterior surface of said central cone and tube to augment the water flow velocity within said hydro power turbine;
 d. an electric generator rotor with an annular shape and turbine blades affixed to the interior side of said electric generator rotor and with said electric generator rotor set in motion by the augmented water flow velocity of said induced water flow vortex inside said hydro power turbine with said electric generator rotor affixed to said hydro power turbine casing at the diametrically opposite end of where the shroud of said shrouded turbine casing is positioned;
 e. an electric generator stator affixed to said hydro power turbine casing and overlapping said electric generator rotor to generate electric power.

2. The hydro power turbine generator according to claim 1 wherein said central cone and tube can have the shape of a half or full prolate spheroid.

3. The hydro power turbine generator according to claim 1 wherein the diameter and length of said shrouded turbine casing, central cone and tube may be adjusted to optimize said water flow velocity within said hydro power turbine and electric power output.

4. The hydro power turbine generator according to claim 1 including means to enable buoyancy of said hydro power turbine.

5. The hydro power turbine generator according to claim 1 including means to anchor said hydro power turbine to the bottom of a river or sea through one or more tethers.

6. The hydro power turbine generator according to claim 1 including means to optimize said hydro power turbine placement in said naturally occurring water flow.

7. The hydro power turbine generator according to claim 1 including provisions to use lightweight construction materials and in particular plastics to manufacture said hydro power turbine.

8. The hydro power turbine generator according to claim 1 including provisions for modular expansion where:
   a. a second hydro power turbine is affixed to said electric generator rotor diametrically opposite to said hydro power turbine generator;
   b. multiple embodiments of said hydro power turbine generator are linked sequentially, positioned parallely, or arranged in other relevant combinations.

* * * * *